United States Patent Office 2,878,247
Patented Mar. 17, 1959

2,878,247

PREPARATION OF 6-METHYL STEROIDS OF THE PREGNANE SERIES

Luis E. Miramontes, Miguel A. Romero, and O Fritsche, Mexico City, Mexico, assignors to G. D. Searle & Co., Chicago, Ill., a corporation of Delaware No Drawing. Application September 27, 1957
Serial No. 686,564

7 Claims. (Cl. 260—239.55)

This invention relates to 6-methyl compounds derived from the cyclopentane perhydrophenanthrene series, and more specifically to 6α-methyl-17α-hydroxy-Δ⁴-pregnene-3,20-dione, 6-methyl-16α,17α-oxido-Δ⁵-pregnene-3β-ol-20-one and esters, and 6α-methyl-16α,17α-oxido-Δ⁴-pregnene-3,20-dione. 6-methyl substituents are known to increase certain specific physiological activities. A high progestional activity is exhibited by the 6α-methyl-17α-hydroxy progesterone as disclosed in the copending application S. N. 686,563 filed simultaneously herewith by Bjarte Loken. Even more advantageous, the 6α-methyl-17α acetoxy progesterone has oral progestional activity. Furthermore, the novel compounds comprising this invention can also be used as intermediates in the manufacture of other 6-methylated steroids, in the manner described in the aforementioned copending application.

In general terms the synthesis of these compounds is effected as follows: 6-methyl-Δ⁵,¹⁶-pregnadiene-3β-ol-20-one acetate, prepared as described in the Miramontes et al. copending patent application S. N. 686,562 filed simultaneously herewith is treated with alkaline hydrogen peroxide in an organic solvent like methanol or methanol-chloroform mixture and the solution allowed to stand at room temperature for several hours. The reaction is then worked up by diluting with water and extracting the precipitate formed with chloroform. The chloroform solution is washed with water, dried over sodium sulfate and evaporated almost to dryness. The residue is treated with ether whereupon a crystalline precipitate of 6-methyl-16α,17α-oxido-Δ⁵-pregnene-3β-ol is formed. In order to obtain 6α-methyl-16α,17α-oxido-Δ⁴-pregnene - 3,20 - dione the above mentioned epoxy-pregnadienol is subjected to Oppenauer oxidation whereby the 3β-hydroxyl is converted to the 3-ketone and the double bond is brought to conjugation. This compound is then transformed into a bromohydrin by reacting it with hydrobromic acid in acetic acid; the bromohydrin is isolated by precipitation with water and filtration or else it may be extracted with ether. This bromohydrin is converted to the desired 16α-methyl-17α-hydroxy-Δ⁴-pregnene-3,20-dione by splitting off the bromine atom at $C_{16}$ by means of Raney nickel catalyst used in refluxing methanol.

The synthesis may be represented by the following formulae:

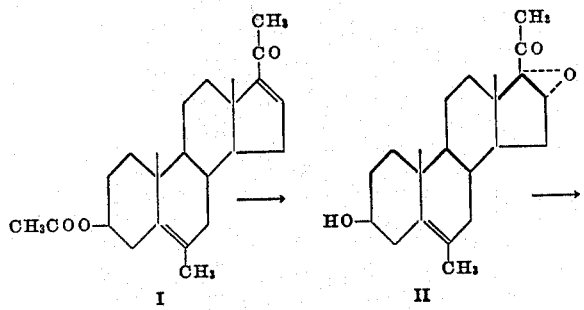

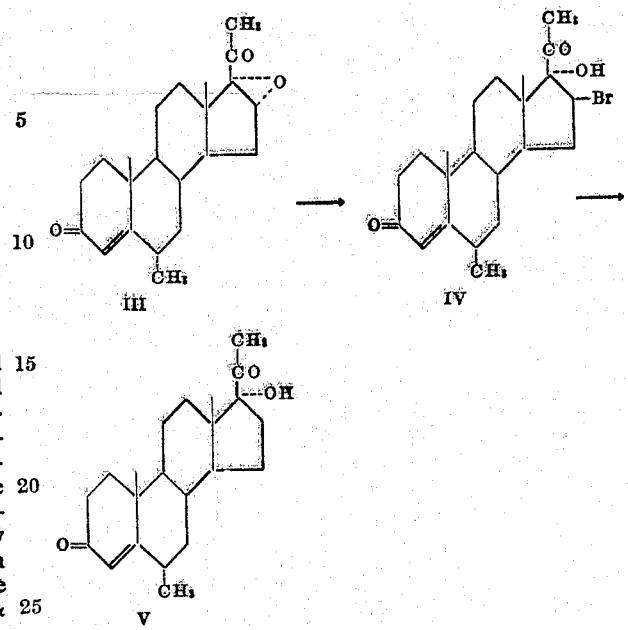

EXAMPLE I

*6-methyl-16α,17α-oxido-Δ⁵-pregnene-3β-ol-20-one*

A solution of 5 g. of 6-methyl-Δ⁵,¹⁶-pregnadiene-3β-ol-20-one acetate (I) in 300 cc. of methanol is treated at room temperature with 1.8 g. of sodium hydroxide dissolved in 10 cc. of water and with 18 cc. of 35% hydrogen peroxide. This mixture is then kept at room temperature for 24 hours after which it is poured into water and the solid precipitate formed extracted three times with chloroform. The chloroform solution is washed with water, dried over anhydrous sodium sulfate and evaporated almost to dryness. The residue crystallizes in thin colorless plates when some ether is added to it. The crystalline solid is collected by filtration, 4 g., M. P. 172–175° C.; crystallization from acetone-ether raised the M. P. to 178–181° C. (analytical sample, M. P. 180–183° C., recrystallized from the same solvent); $[α]_D$ —4.17° (chlf.). *Analysis.*—Calcd. for $C_{22}H_{32}O_3$: C, 76.70; H, 9.36. Found: C, 76.87; H, 9.45.

EXAMPLE II

Reacting the 6-methyl derivative (I) in the same manner described in Example I, but using a chloroform-methanol mixture in place of methanol alone yielded the same 16α,17α-epoxide showing identical constants as those mentioned in Example I.

EXAMPLE III

*6α-methyl-16α,17α-oxido-Δ⁴-pregnene-3,20-dione*

A solution of 5 g. of epoxide (II) in 100 cc. of toluene is distilled until 25 cc. of solvent are removed. To this solution is added 50 cc. of cyclohexanone and a solution of 10 g. of aluminum iso-propoxide in 100 cc. of toluene. The mixture is refluxed for one half hour and when cool it is poured into ice-water acidified with dilute sulfuric acid, and then extracted with benzene twice. The combined extracts are steam-distilled to eliminate the cyclohexanone, and the residue is extracted with ether. The ether solution, after washing with water twice and drying over anhydrous sodium sulfate, is evaporated to dryness and the residue is chromatographed over alumina;

elutions with hexane-benzene 50:50 afford a crystalline solid M. P. 146–158° C.;

$$\lambda_{max}^{EtOH}\ 240\ m\mu$$

(log ϵ 4.2). *Analysis.*—Calcd. for $C_{22}H_{30}O_3$: C, 77.15; H, 8.83. Found: C, 76.77; H, 8.85.

EXAMPLE IV

*6α-methyl-Δ⁴-pregnene-17α-ol-3,20-dione (6α-methyl 17α-hydroxy progesterone)*

The epoxide III described in Example III (500 mg.) is reacted with excess hydrobromic acid in acetic acid solution at room temperature for one half hour. The mixture is poured into ice-water and the bromohydrin is either collected by filtration (M. P. 95–100° C.) or extracted with ether. The dry bromohydrin is refluxed two hours in methanol solution with twice its weight of Raney nickel. The Raney nickel is removed by filtration, and the methanol solution is evaporated almost to dryness. The residue crystallizes overnight in colorless needles (350 mg.), M. P. 205–208° C. Recrystallization from aqueous acetone affords a product, M. P. 211–213° C.; $[\alpha]_D$ +78° (chlf.);

$$\lambda_{max}^{EtOH}\ 240\ m\mu$$

(log ϵ=4.2). *Analysis.*—Calcd. for $C_{22}H_{32}O_3$: C, 76.70; H, 9.36. Found: C, 76.77; H, 9.51.

What is claimed is:
1. 6-methyl-16α,17α-oxido-Δ⁵-pregnene-3β-ol-20-one.
2. 6α-methyl-16α,17α-oxido-Δ⁴-pregnene-3,20-dione.
3. 6α-methyl - 16β - bromo - Δ⁴ - pregnene-17α-ol-3,20-dione.
4. The process for converting 6-methyl Δ⁵,¹⁶-pregnadiene-3β-ol-20-one acetate to 6α-methyl-17α hydroxy progesterone which comprises contacting the pregnadiene with hydrogen peroxide whereby the 16,17 position is epoxidized and the 3-acetoxy group is hydrolyzed; thereafter contacting the resulting 16α,17α-oxido-Δ⁵-pregnene-3β-ol-20-one with aluminum isopropoxide whereby the pregnene is converted to 16α,17α-oxido-Δ⁴-pregnene-3,20 dione; then contacting the resulting dione with hydrobromic acid whereby the dione is converted to the bromohydrin; and finally contacting the bromohydrin with a hydrogenating agent to form the desired 6α-methyl-17α hydroxy progesterone.
5. The process of claim 4 wherein the epoxidation is effected in an alkaline solution of hydrogen peroxide in a solvent selected from the group consisting of methanol and mixtures of methanol with chloroform.
6. The process of claim 4 wherein the treatment with hydrobromic acid is effected in a solution of hydrobromic acid in acetic acid.
7. The process of claim 4 wherein the hydrogenation is effected by reflux of the steroid in methanol in the presence of Raney nickel.

No references cited.